US011023119B2

(12) United States Patent
Shimomura

(10) Patent No.: US 11,023,119 B2
(45) Date of Patent: Jun. 1, 2021

(54) APPLICATION PROGRAM, TERMINAL DEVICE CONTROLLING METHOD, TERMINAL DEVICE AND SERVER

(71) Applicant: DWANGO, Co., Ltd., Tokyo (JP)

(72) Inventor: Hiroki Shimomura, Tokyo (JP)

(73) Assignee: DWANGO, Co., Ltd., Tokyo (JP)

( * ) Notice: Subject to any disclaimer, the term of this patent is extended or adjusted under 35 U.S.C. 154(b) by 0 days.

(21) Appl. No.: 16/489,314

(22) PCT Filed: Feb. 21, 2018

(86) PCT No.: PCT/JP2018/006191
§ 371 (c)(1),
(2) Date: Aug. 27, 2019

(87) PCT Pub. No.: WO2018/159409
PCT Pub. Date: Sep. 7, 2018

(65) Prior Publication Data
US 2020/0159398 A1    May 21, 2020

(30) Foreign Application Priority Data

Feb. 28, 2017   (JP) .............................. JP2017-037355

(51) Int. Cl.
*G06F 3/048* (2013.01)
*G06F 3/0484* (2013.01)
*G06F 3/16* (2006.01)

(52) U.S. Cl.
CPC .......... *G06F 3/04847* (2013.01); *G06F 3/165* (2013.01)

(58) Field of Classification Search
None
See application file for complete search history.

(56) References Cited

U.S. PATENT DOCUMENTS

2007/0260677 A1* 11/2007 DeMarco .............. G06F 40/169
709/203
2008/0246743 A1* 10/2008 Ward .................... G06F 3/0488
345/173

(Continued)

FOREIGN PATENT DOCUMENTS

CN       102770840 A     11/2012
CN       103527220 A      1/2014
(Continued)

OTHER PUBLICATIONS

English translation of Notice of Reasons for Refusal received in JP Application No. 2017-037355 dated Jun. 5, 2019.
(Continued)

*Primary Examiner* — Tuan S Nguyen
(74) *Attorney, Agent, or Firm* — Dorsey & Whitney LLP

(57) ABSTRACT

The present invention provides: an application program which assists with an intuitive understanding of the position of each page of a slide on a time axis; a terminal device controlling method; a terminal device; and a server. The application program of the terminal device, which plays a slide and an audio synchronized with the slide, makes a computer of the terminal device 3 function as a display control unit 32 which displays an interface 100 provided with a first interface 123 that represents a playback position of the audio and a second interface 135 that represents a playback position of each page of the slide, and function as a play control unit 32 which plays the slide and audio at designated playback position, wherein when a playback position of one among the first interface 123 and the second interface 135 is designated, the display control unit 32 makes a playback position of the other correspond to the designated playback position.

7 Claims, 15 Drawing Sheets

(56) References Cited

U.S. PATENT DOCUMENTS

2011/0107214 A1* 5/2011 Kouznetsov ........... G11B 27/10
                                                              715/716
2017/0229152 A1* 8/2017 Loganathan ....... H04N 21/4722

FOREIGN PATENT DOCUMENTS

| | | |
|---|---|---|
| CN | 104145259 A | 11/2014 |
| CN | 104737185 A | 6/2015 |
| CN | 105704165 A | 6/2016 |
| JP | 2008219424 A | 9/2008 |
| JP | 2009225354 A | 10/2009 |
| JP | 2014072738 A | 4/2014 |
| JP | 2016152545 A | 8/2016 |

OTHER PUBLICATIONS

International Search Report and Written Opinion received in PCT/JP2018/006191 dated Apr. 10, 2018 (Engl translation of ISR only).
1st Office Action for CN Application No. 201880009396.2, dated Feb. 9, 2021.

* cited by examiner

Figure 4

| Metadata | ........ | | | |
|---|---|---|---|---|
| Page | Start time | End time | Record address |
| 1 | 0:00 | 0:14 | aaaaaa |
| 2 | 0:15 | 0:30 | bbbbbb |
| 3 | 0:30 | 1:37 | cccccc |
| ⋮ | ⋮ | ⋮ | ⋮ |

41 42 43 44

40 TBL1

Figure 5

| Audio ID | yyyyyy |
| Slide ID | xxxxxx |
| User ID | zzzzzz |
| Record address | dddddd |

TBL2
50
51
52
53

Figure 6

| Slide ID | xxxxxx (60) | | TBL3 |
|---|---|---|---|
| Comment posting time | Page | Details of comment | |
| 0:20 | 1 | Understand wwwwwww | |
| 0:25 | 1 | How is it implemented? | |
| ⋮ | ⋮ | ⋮ | |

| | | |
|---|---|---|
| Playback position counter | 0:00 | 70 |
| The first slide-bar counter | 0:00 | 71 |
| The second slide-bar counter | 1 | 72 |

CNT1

APPLICATION PROGRAM, TERMINAL DEVICE CONTROLLING METHOD, TERMINAL DEVICE AND SERVER

CROSS-REFERENCE TO RELATED APPLICATIONS

This application is a U.S. National Stage filing under U.S.C. § 371 of PCT Application No. PCT/JP2018/006191 filed Feb. 21, 2018, which claims priority to Japanese Application No. 2017-037355 filed Feb. 28, 2017, which applications are incorporated herein by reference in their entirety, for any purpose.

TECHNICAL FIELD

The present invention relates to an application program, a terminal device controlling method, a terminal device and a server.

BACKGROUND TECHNOLOGY

In traditional services as described in Patent Literature 1, slide data is distributed as a slide show together with the audio that is recorded in sync with the slide show. According to Patent Literature 1, a presenter creates presentation material on a personal computer (hereinafter referred to as a PC) and uploads to a server. The uploaded presentation material is converted to slide data comprising multiple images and stored in a slide data memory section of the server.

Next, the presenter downloads the slide data stored in the server to a terminal device such as a notebook PC and makes a presentation by playing the slide data on the terminal device. The presenter also records audio for the presentation on the terminal device. The audio data is stored on the terminal device in a predetermined format. Additionally, when the presenter switches a page of the slide to the next, the switchover timing data is stored in the terminal device.

After completing the presentation, the presenter uploads to the server the audio data and switchover timing data stored in the terminal device. When the audio data and the switchover timing data are uploaded to the server, the server creates the data for distribution from the slide data stored in the server incorporating the audio data and switchover timing data just obtained.

When a viewer sends a request to the server for receiving the presentation, the server sends out the requested presentation data that contains the slides with synchronized audio of the presenter.

The distribution of the presentation data is executed from the distribution screens created by the server. The distribution screen has an area for displaying the slide, an area for a seek bar that indicates the playback position of the audio related to the subject slide, and an area for displaying a slide thumb nail.

The viewer can see the presentation starting from any desired slide or any position of the slide by clicking the thumb nail on the seek bar.

PRIOR ART LITERATURE

Patent Literature

Patent Literature Patent 1: Japanese Patent Application Publication No. 2016-152545

SUMMARY OF INVENTION

Problems to be Solved by Invention

In the service described in Patent Literature 1, a seek bar that represents the position of the audio playback is displayed with respect to the time axis, but it is difficult to find which page of the slide is currently being displayed.

Because only a limited number of thumbnails can be displayed on the distribution screen, is difficult to find a desired page using the thumb nail when there are many pages, 100 pages for example. A cumbersome thumb nail operation going back and forth may be necessary until a desired page is found.

Thus, the objective of the present invention is to provide an application program, a terminal device controlling method, a terminal device and a server that allow intuitively understanding the position of each page of a slide on a time axis.

Means or Solving Problems

For solving the problems, the application program related to the present invention is configured as described below.

The present invention relates to an application program of the terminal device which plays a slide and an audio synchronized with the slide, wherein the application program enables a computer of the terminal device to function as a display control unit to display an interface related to playing the slide and the audio, and function as a play control unit to play the slide and the audio starting from a position designated on the interface, wherein the interface comprises: a first interface that represents the playback position of audio; and a second interface that represents the playback position of each page of the slide, wherein when a playback position of one among the first interface and the second interface is designated, the display control unit makes a playback position of the other correspond to the designated playback position.

In the description of the present invention, "related to play" means not only a continuous operation of simple play but also other various operational concepts such as pause, fast forward, etc.

Additionally, in this description, "the first interface" and "the second interface" are shown as physically separated in terms of seek bars displaying time axes. However, aspects of the present invention are not limited to this configuration. For example, the first interface and the second interface can be superimposed as long as the audio playback position on the time axis and the playback position of each page of the slide on the time axis can be displayed.

According to the present invention, the computer functioning as the display control unit displays the interface for playing the slide and audio. The interface comprises the first interface that represents the playback position of the audio and the second interface that represents the playback position of each page of the slide. The playback position of the audio and the playback position of each page of the slide are linked and displayed in synchronization with each other. When the playback position of the audio is designated, the playback position of the slide is made to correspond to the playback position of the audio. Similarly, when the playback position of the slide is designated, the playback position of the audio is made to correspond to the playback position of the slide. Thus, when a user is viewing the slide, the user can intuitively understand the position of each page of the slide and the playback position of the audio.

According to the present invention, the computer functioning as the display control unit in accordance with the application program displays the switchover timing for each page of the slide as a playback position on the second interface. Thus, the user viewing the slide can intuitively understand the playback position of the audio on the time axis and the switchover timing of each page of the slide on the time axis.

Another feature of the present invention is that on the time axis the second interface indicates relative time span of each page between switching over to the next in proportion to the overall play time of the entire slide.

According to the present invention, the computer functioning as the display control unit in accordance with the application program creates a web page in which the time span of each page between switching over to the next is displayed on the time axis of the second interface in proportion to the overall play time of the entire slide. Thus, the user viewing the slide can visually understand the playback position of the audio on the time axis and the relative importance of each page of the slide.

Another feature of the present invention is that the second interface displays a popup in the first interface, wherein the popup contains information on an applicable page number of the slide and a playback elapsed time with respect to the playback start time of the first page of the slide.

According to the present invention, the computer functioning as the display control unit in accordance with the application program displays the audio playback position on the first interface. Additionally, the computer functioning as the display control unit performs pop-up displays on the first interface and thereby displays the page number of the slide and the playback elapsed time with reference to the playback start time of the first page of the slide. Thus, the user viewing the slide can intuitively understand the audio playback position on the time axis and the position of each page of the slide on the time axis.

Another feature of the present invention is that the application program enables the computer to function as a user-posted information control unit for sending user comments received at a terminal device to the server and receiving back user-posted information from the server, and the display control unit comprises the third interface that represents a playback position of the user-posted information, wherein when a playback position of the user-posted information is designated on the third interface, the display control unit makes the playback positions of the first and the second interfaces correspond to the designated playback position.

According to the present invention, the computer functioning as the user-posted information control unit in accordance with the application program sends user-posted information received at the terminal device to the server and receives the user comments from the server. When a playback position of the user-posted information of the third interface that represents the playback position of the user-posted information is designated, the computer functioning as the display control unit makes the playback position of the first and the second interface correspond to the designated playback position of the user-posted information. Thus, the user viewing the slide can intuitively understand not only the playback positions of the audio and each page of the slide but also the user-posted information on the time axes.

In the description of the present invention, "user-posted information" is the overall concept including comments, stamps, link information, audio data and related items.

For solving the problems, the terminal device controlling method related to the present invention is configured with the following features.

The present invention relates to a method for controlling a terminal device that plays a slide and an audio synchronized with the slide, the method comprising: displaying the interfaces related to playing of the slide and the audio; and playing the slide and the audio starting from a position designated on the interface, wherein the interface comprises: the first interface that represents the playback position of audio; and the second interface that represents the playback position of each page of the slide, wherein when the playback position of one among the first interface and the second interface is designated, the interface makes a playback position of the other correspond to the designated playback position.

According to the present invention, the interface for playing the slide and audio is displayed, and the play is executed from the playback positions designated on the interface. The interface comprises the first interface that represents the playback position of the audio and the second interface that represents the playback position of each page of a slide. The playback position of the audio and the playback position of each page of a slide are linked and displayed in synchronization with each other. When the playback position of the audio is designated, the playback position of the slide is made to correspond to the designated playback position of the audio. Similarly, when the playback position of the slide is designated, the playback position of the audio is made to correspond to the designated playback position of the slide. Thus, when a user is viewing the slide, the user can intuitively understand the playback position of each page of a slide and the playback position of the audio.

For solving the problems, the terminal device related to the present invention is configured with the following features.

The present invention relates to a terminal device which plays a slide and an audio synchronized with the slide, wherein the terminal device comprises: the display control unit that displays the interface related to playing of the slide and the associated audio; and the play control unit that plays the slide and the associated audio starting from a position designated on the interface, wherein the interface comprises: the first interface that represents the playback position of the audio; and the second interface that represents the playback position of each page of the slide, wherein when the playback position of one among the first interface and the second interface is designated, the display control unit makes the playback position of the other correspond to the designated playback position.

According to the present invention, the display control unit displays the interface for playing the slide and audio, and the play control unit plays the slide and audio from the playback positions designated on the interface. The interface comprises the first interface that represents the playback position of the audio and the second interface that represents the playback position of each page of a slide. The playback position of the audio and the playback position of each page of a slide are linked and displayed in synchronization with each other. When the playback position of the audio is designated, the display control unit makes the playback position of the slide correspond to the playback position of the audio. Similarly, when the playback position of the slide is designated, the display control unit makes the playback position of the audio correspond to the playback position of the slide. Thus, when a user is viewing the slide, the user can intuitively understand the playback position of each page of a slide and the playback position of the audio.

For solving the problems, the server related to the present invention is configured with the following features.

A server of the present invention which is capable of communicating with terminal devices and distributes contents containing slide and associated audio that have been posted from the terminal devices, wherein the server comprises: the server control unit that displays the interface related to playing the slide and the audio, wherein the interface comprises: the first interface that represents the playback position of audio; and the second interface that represents the playback position of each page of the slide, wherein the playback position of audio and the playback position of each page of the slide a linked and displayed in synchronization with each other.

According to the present invention, the server control unit displays the interface for playing the slide and audio. The interface comprises the first interface that represents the playback position of the audio and the second interface that represents the playback position of each page of a slide. The playback position of the audio and the playback position of each page of a slide are linked and displayed in synchronization with each other. When the playback position of the audio is designated, the playback position of the slide is made to correspond to the designated playback position of the audio. Similarly, when the playback position of the slide is designated, the playback position of the audio is made to correspond to the designated playback position of the slide. Thus, when a user is viewing the slide, the user can intuitively understand the playback position of each page of a slide and the playback position of the audio.

Effect of the Invention

The present invention allows a viewer to intuitively understand the playback position of each page of a slide on a time axis.

BRIEF DESCRIPTION OF DRAWINGS

FIG. 4 is the control table TBL1 of slide data for viewing.

FIG. 5 is the control table TBL2 of audio data for viewing.

FIG. 6 is the comment control table TBL3.

FIG. 7 is a diagram showing the counter.

EMBODIMENT OF THE INVENTION

First Embodiment

Figure 1:
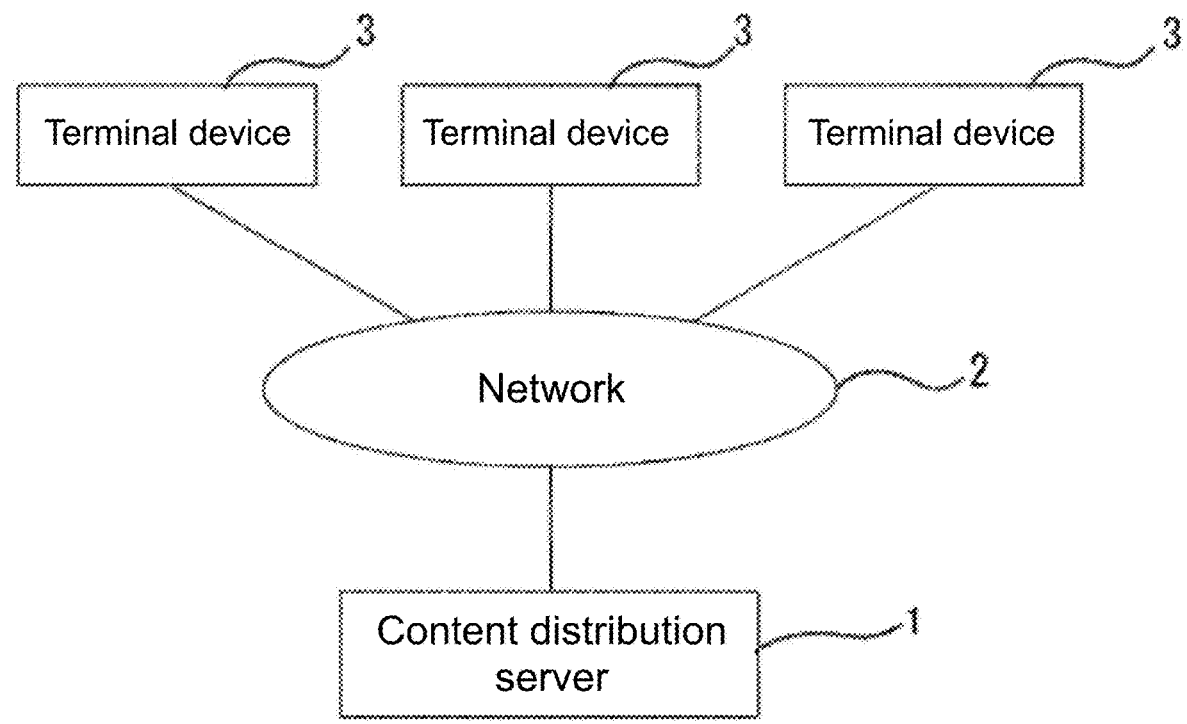
FIG. 1 is a schematic diagram showing the content distribution system of a first embodiment of the present invention.
Figure 2:
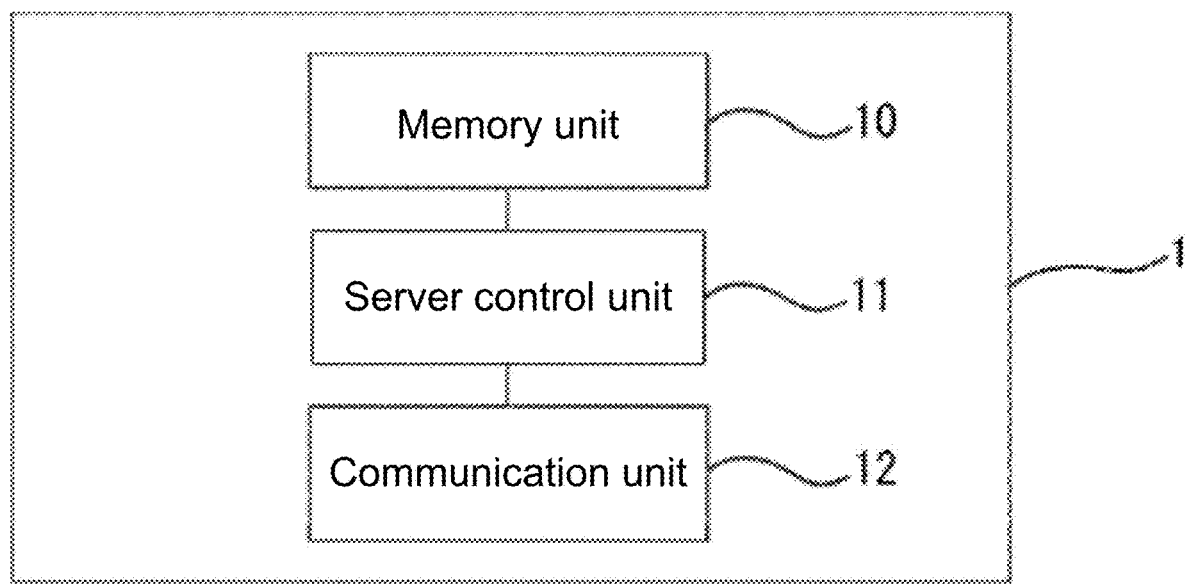
FIG. 2 is a schematic block diagram showing a configuration of the content distribution server of the first embodiment.
Figure 3:
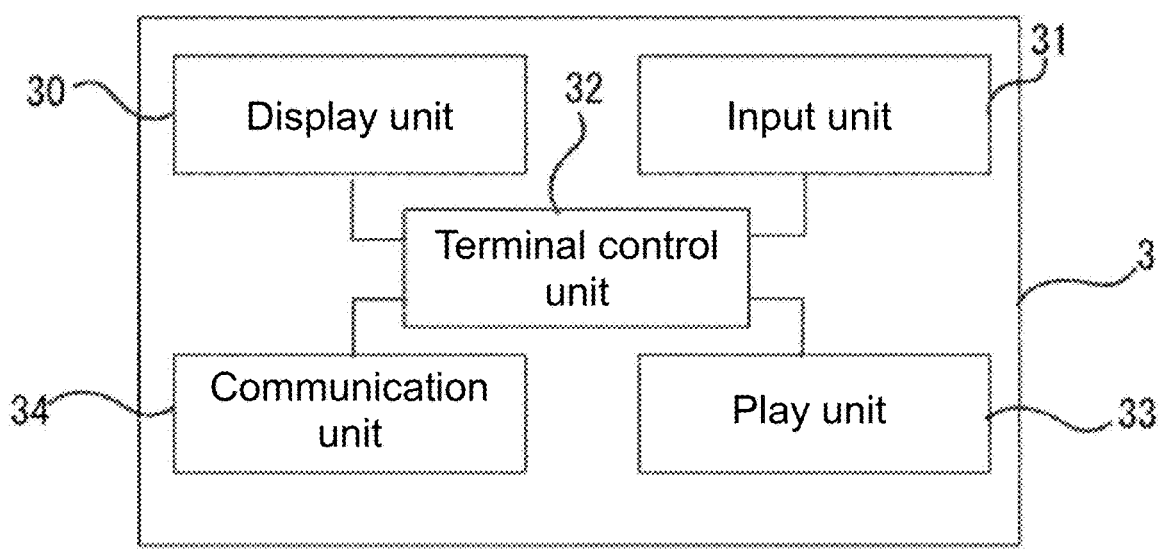
FIG. 3 is a schematic block diagram showing a configuration of terminal device of the first embodiment.

The first embodiment of the present invention is described below with reference to the drawings. FIG. 1 is a schematic diagram showing the content distribution system of the first embodiment of the present invention. FIG. 2 is a schematic block diagram showing a configuration of the content distribution server of the first embodiment. FIG. 3 is a schematic block diagram showing a configuration of terminal device of the first embodiment.

(Content Distribution System)

As shown in FIG. 1, the content distribution system of the first embodiment of the present invention is provided with a content distribution server 1, a network 2 such as the Internet, and a terminal device 3 in which terminal devices 3 are connected to the content distribution server 1 through the network 2.

In the content distribution system of the first embodiment of the present invention, it is configured in such a way that slide data can be uploaded to the content distribution server 1. When slide data is uploaded from the terminal device 3 via the network 2, the content distribution server 1 encodes (converts) the uploaded slide data format to the viewing format. Slide data format when uploading can be PDF format, for example. A slide format for viewing can be JPEG, for example. The user can assign any title to the uploading slide data. The content distribution server 1 stores the encoded slide data to the memory unit 10, as discussed later, while associating with the tile assigned by the user.

A user installs the application program into the terminal device 3 in advance for slide viewing, then the user can view a slide by starting up the application program and selecting a desired title of a slide.

In the content distribution system of this embodiment, not only the user can view a slide by selecting a desired title, but also upload the audio narration while viewing the slide. When the content distribution server 1 receives audio narration related to the slide from the terminal device 3 via the network 2, the content distribution server 1 encodes the received audio data format to the audio data format for viewing. The format of the uploading audio data can be WMA, for example. The audio data format for viewing can be MP3, for example.

The content distribution server 1 stores the encoded audio data to the memory unit 10, as discussed later, while associating with the slide data of the selected title. In other words, the content distribution server 1 stores in the memory unit 10 the slide data and the audio data by linking under the same selected title. A user can view a slide with audio attached on the terminal device 3 by starting up the application program and selecting a desired title of a slide.

When the content distribution server 1 receives a distribution request for a slide data or a slide data with audio data from the terminal device 3 via the network 2, the content distribution server 1 sends the requested data (slide data or slide data with audio data) to the requesting terminal device 3. The requesting terminal device 3 may be one that unloaded the slide data or audio data, or it may be any other terminal device 3.

Additionally, in the content distribution system of the embodiment of the present invention, the user can view either the slide or the slide with audio attached of any title and can upload user-posted information such as comments. In this embodiment, the content distribution server 1 also functions as the user-posted information distribution server. The content distribution server 1 accepts comments pertaining to the slide or the slide with audio attached from the terminal device 3 via the network 2. The format of comment data can be text format, for example. The content distribution server 1 records the received comments by linking to the selected title of the slide data. More precisely, the content distribution server 1 stores in the memory unit 10 the comment text data linking to the slide data. When the slide data is linked to the audio data, the content distribution server 1 also stores in the memory unit 10 the received time of the comments with respect to the play time of the audio data.

"Comments" is one example of user-posted information. Here, "user-posted information" is the overall concept including comments, stamps, link information, audio data and related items.

When the user views the slide or the slide with audio attached by selecting the desired title on the terminal device 3, the comments are displayed on the terminal device 3 together with the slide if the comments linked to the slide are stored in the memory unit 10.

As shown in FIG. 2, the content distribution server 1 is provided with the memory unit 10, the server control unit 11, and the communication unit 12. The memory unit 10 is configured with an HDD (Hard Disk Drive), for example. The program of the content distribution server 1 of the present invention is stored in the memory unit 10. Additionally, stored in the memory unit 10 are the encoded slide data for viewing, the encoded audio data for viewing and the text data of comments, etc.

The server control unit 11 is configured with CPU and others. The server control unit 11 functions as the controller of the content distribution server 1 by executing programs stored in the memory unit 10. The server control unit 11 converts the uploaded slide data into the slide data for viewing. Similarly, the server control unit 11 converts the uploaded audio data into the audio data for viewing. Additionally, the server control unit 11 stores in the memory unit 10 the slide data for viewing, the audio data for viewing, and the comment text data. Furthermore, the server control unit 11 searches stored data in the memory unit 10 and retrieves data. The server control unit 11 controls the communication unit 12 for receiving various data from the terminal device 3 and distributing various data to the terminal device 3.

The communication unit 12 interfaces with the network 2 for data communication and is controlled by the server control unit 11. In this embodiment, the Internet is used for the network 2 as an example. In this case, the communication unit 12 interfaces with the Internet for data communication.

As shown in FIG. 3, the terminal device 3 is provided with the display unit 30, the input unit 31, the terminal control unit 32, the play unit 33, and the communication unit 34. Even though not shown in the Figure, the terminal device 3 provides the memory unit. The terminal device 3 can communicates with various servers via the network 2. Various types of equipment can be used as terminal devices, such as a mobile phone, a smart phone, a mobile terminal such as an information terminal device, a PC, a game machine, a TV, etc. The display unit 30 can be a liquid crystal display, for example, of a mobile phone, a smart phone, a mobile terminal such as information terminal device, a PC, a game machine, a TV, etc.

By using the input unit 31, the user inputs instructions for operation, comments, etc. The input unit 31 is configured with a touch panel integrated with the display unit 30, a keyboard, for example. The input unit 31 also includes a microphone for audio input.

The application program of the present invention is installed into the terminal device 3 in advance from the application program distribution server whose illustration is not provided here. The terminal control unit 32 provides CPU and others, and by starting up the application program it functions as a display control section, a play control section, a content control section and a user-posted information control section. The terminal control unit 32 controls the display unit 30, the input unit 31, the play unit 33 and the communication unit 34. The terminal control unit 32 receives the slide data and the comment data for viewing from the content distribution server 1 and makes the display unit 30 display these data. Additionally, the terminal control unit 32 receives the audio data for viewing from the content distribution server 1 and makes the play unit 33 play these data. Furthermore, the terminal control unit 32 receives the comments text data from the content distribution server 1 and makes the play unit 33 play the data.

The terminal control unit 32, functioning as the display control section, makes the display unit 30 display the interface related to playing the slide and audio. The interface is provided with the first interface that represents a playback position of the audio on the time axis and the second interface that that represents a playback position of each page of the slide. When a playback position of one among the first interface and the second interface is designated, the terminal control unit 32 makes a playback position of the other correspond to the designated playback position. The details of the first interface and the second interface are discussed later.

The play unit 33 is configured with the amplifiers, speak, etc. The play unit 33 plays the audio data for viewing in accordance with directives from the terminal control unit 32.

The communication unit 34 interfaces with the network 2 for data communication and is controlled by the terminal control unit 32. In this embodiment, the Internet is used for the network 2 as an example, and thus the communication unit 34 interfaces with the Internet for data communication.

(Data Structure)

The data structure in the content distribution system of the embodiment of the present invention is described next. FIG. 4 shows the control table TBL1 of slide data for viewing. FIG. 5 shows the control table TBL2 of audio data for viewing. FIG. 6 shows the comment control table TBL3. FIG. 7 shows a diagram of the counter.

As shown in FIG. 4, the control table TBL 1 of slide data for viewing is provided with the metadata storage region 40, the page number storage region 41, the start-time storage region 42, the end-time storage region 43 and the record address storage region 44. The meta data storage region 40 stores the metadata which includes a slide ID attached to each slide data, a title of each slide created by the user, etc. The page number storage region 41 stores the page number for each page of a slide data. The record address storage region 44 stores the record address for each page. When the audio data is uploaded for a slide, the start time and the end time of each page, in synchronization with the progression of each page, are stored respectively in the start-time storage region 42 and the end-time storage region 43.

As shown in FIG. 5, the control table TBL 2 of audio data for viewing is provided with the audio ID storage region 50, the slide ID storage region 51, the user ID storage region 52 and the record address storage region 53. The audio ID storage region 50 stores the audio ID attached to the audio data. The slide ID storage region 51 stores the slide ID of the slide for which the audio is uploaded. The user ID storage region 52 stores the user ID of the user who uploaded the audio. The record address storage region 53 stores the record address of the audio data.

As shown in FIG. 6, the comment control table TBL3 is provided with the slide ID storage region 60, the comment posting time storage region 61, the page number storage region 62, and the comment content storage region 63. The slide ID storage region 60 contains the ID of the slide for which a comment(s) is posted. When a comment with audio data is posted for the slide, the time at which the comment is posted is stored in the comment posting time storage region 61. The comment posting time is the beginning of the comment (audio) playback with respect to the playback elapsed time of the slide. When audio data is not uploaded (yet) for the slide, the page number of the slide for which a comment is posted is stored in the page number storage region 62. The comment content storage region 63 stores the text data of the comment posted.

FIG. 7 is the counter diagram CNT1 that is used by the terminal device 3 when executing the application program. As shown in FIG. 7, the counter CNT1 is provided with the playback position counter 70, the first slide-bar counter 71 and the second slide-bar counter 72. The playback position counter 70 indicates the position on the time axis for the audio being played. The value of the playback position counter 70 is configured to be updated as the play time elapses. The first slide-bar counter 71 indicates the position of the first slide bar on the time axis. The second slide-bar counter 72 indicates the page number of the slide being played.

(Interface for Slide Viewing)

Figure 8:
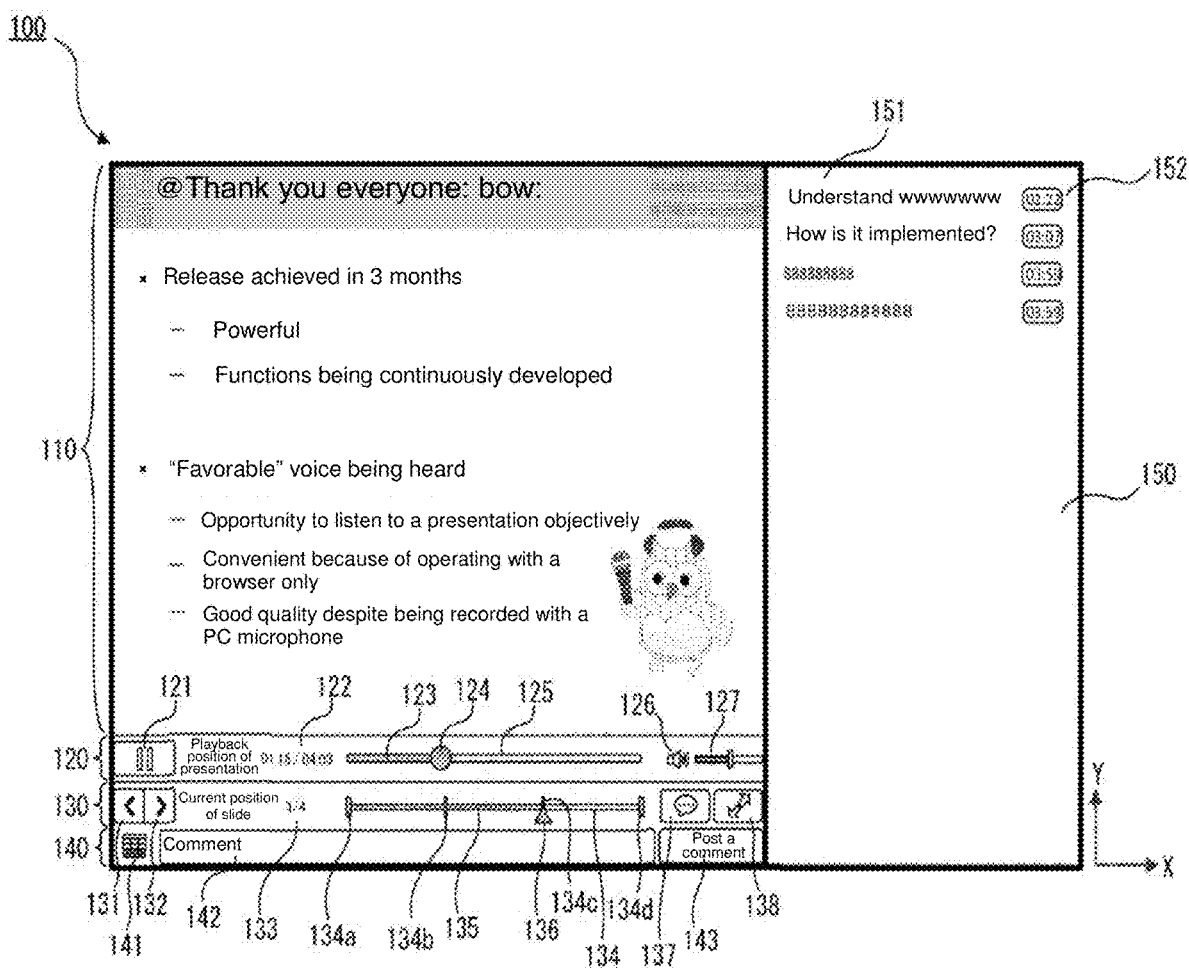
FIG. 8 shows an example of the interface for slide viewing.
Figure 9:
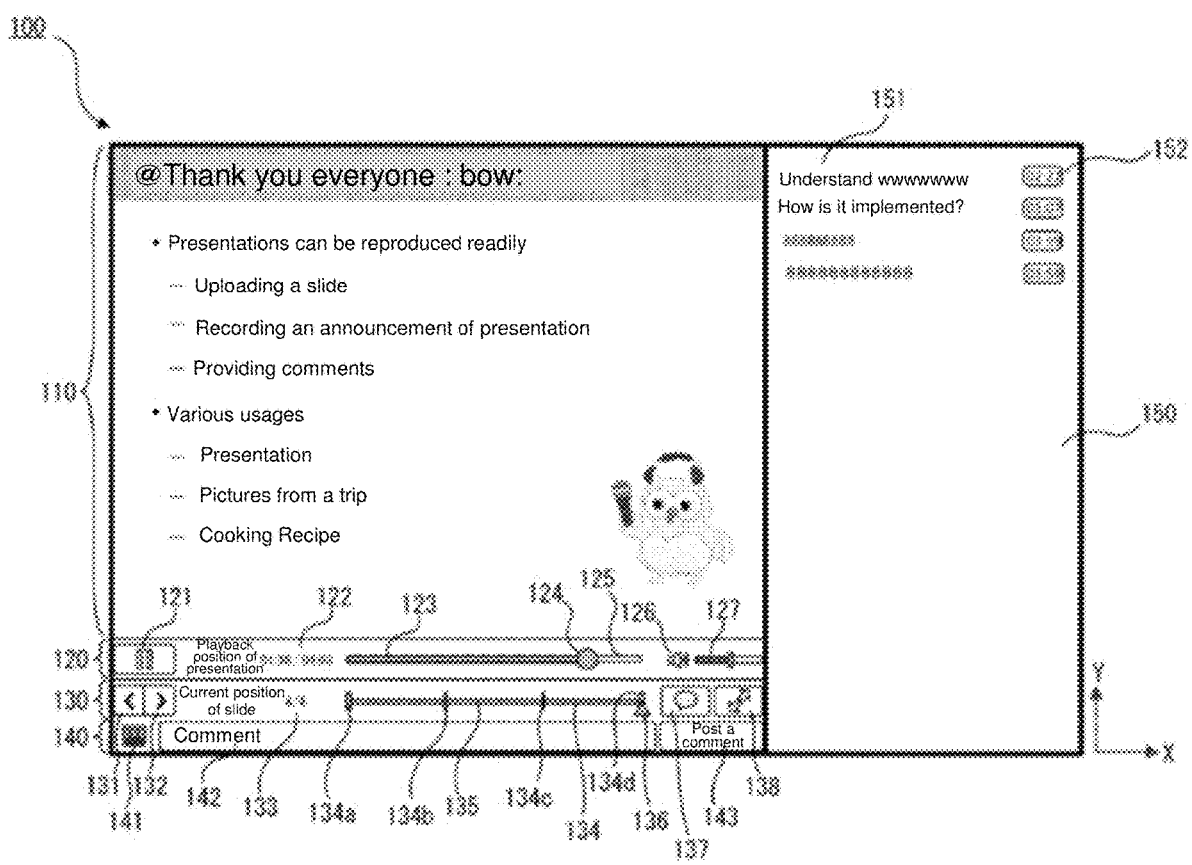
FIG. 9 shows an example of the interface for slide viewing.
Figure 10:
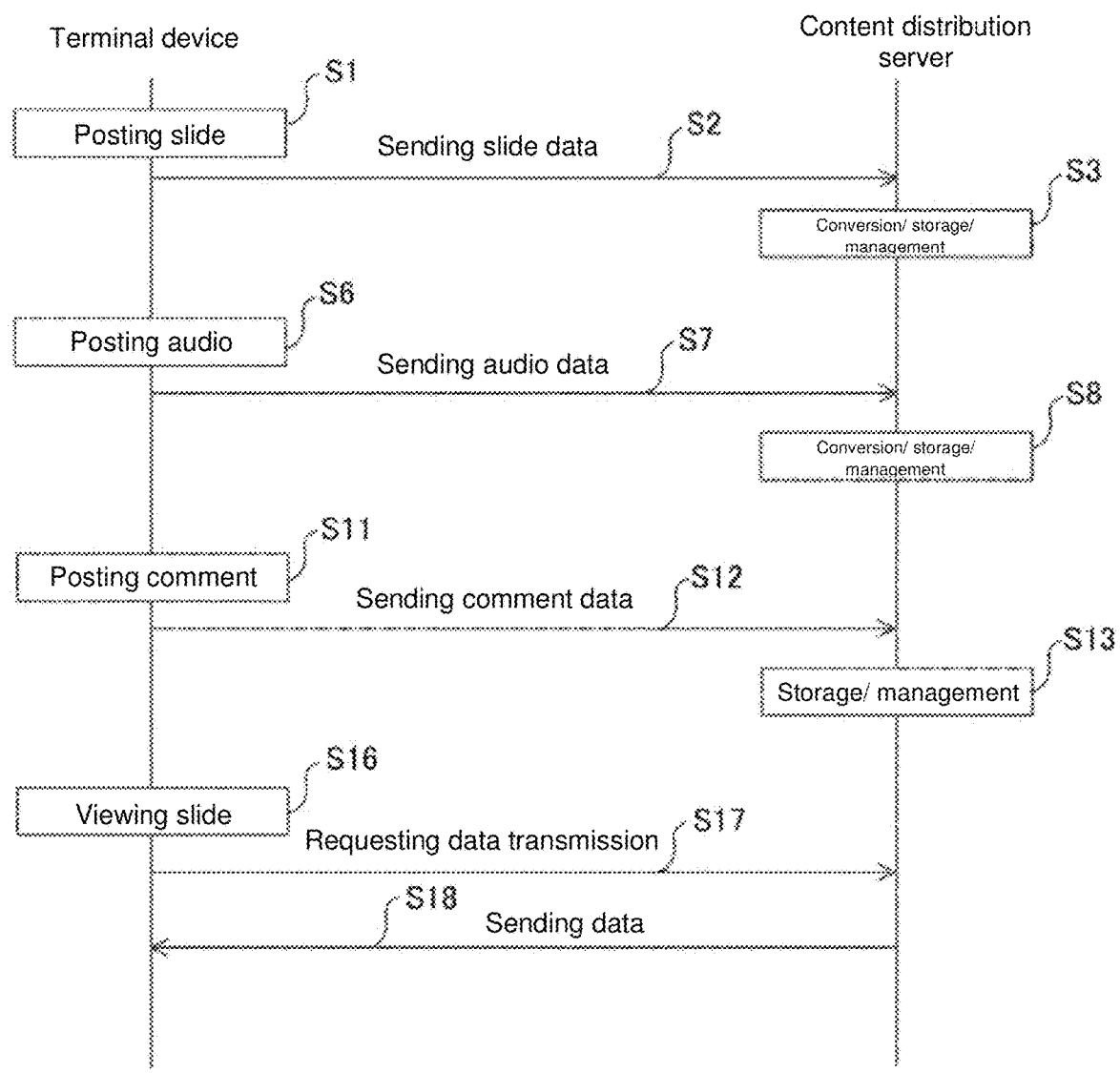
FIG. 10 shows an operational sequence between the terminal device and the content distribution server in the content distribution system.
Figure 11:
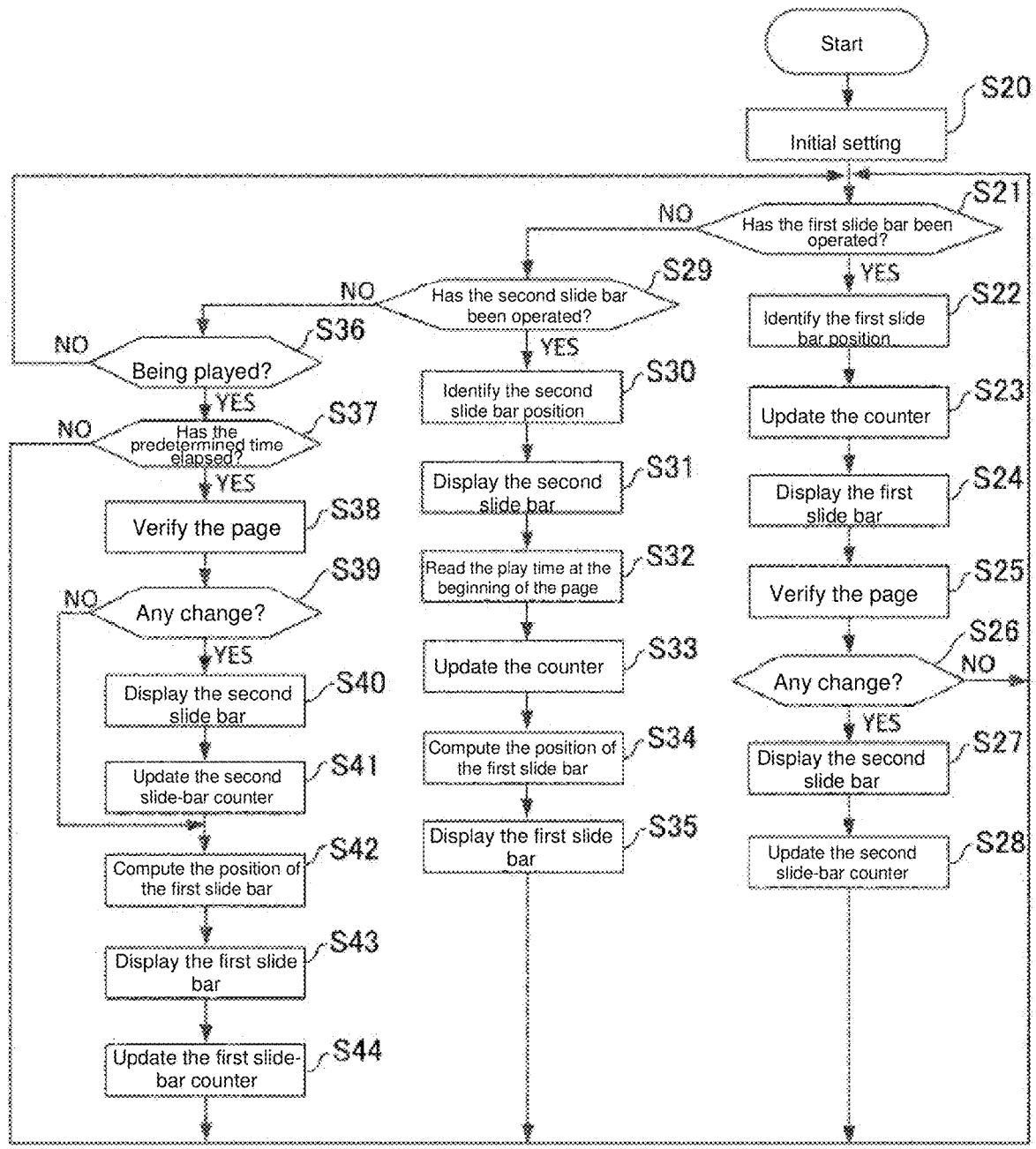
FIG. 11 is a flow chart showing the operation of the terminal device.

The interface for slide viewing in the content distribution system of this embodiment is described next. The FIGS. 8 and 9 show examples of interfaces for slide viewing. FIG. 10 shows an operational sequence between the terminal device and the content distribution server in the content distribution system. FIG. 11 is a flow chart showing the operation of the terminal device.

FIG. 8 shows an example of the interface 100 for slide viewing when the audio is attached to the slide that is to be uploaded. This interface 100 for slide viewing is displayed on the display unit 30 of the user terminal device 3. Examples of the terminal device 3 are personal computers, smart phones, etc. Examples of the display unit 30 are displays associated with personal computers or smart phones, etc. Other examples of the display unit 30 are HMDs (Head Mounted Displays) of VR (Visual Realty), MR (Mixed Reality), AR (Augmented Reality), etc. Additionally, a smart glass may be used as the display unit 30. A projector may be used as the display unit 30.

As shown in FIG. 8, the interface 100 for slide viewing is provided with the slide display area 110, the first slide-bar display area 120, the second slide-bar display area 130, the comment input column display area 140, and the comment display column 150. The slide(s) is displayed on the slide display area 110. The initial page of the slide is set at 1, and the page number is progressed in synchronization with the switchover timing. When a page number is designated, the designated page is displayed.

With the application program being executed on the terminal device 3, a request for the slide data is sent from the terminal device 3 to the content distribution server 1, and then the content distribution server 1 sends the slide data to the terminal device 3. Alternatively, it is possible to make whole or partial slide data be sent from the content distribution server 1 to the terminal device 3 prior to playing the slide.

The first slide-bar display area 120 is provided with the Pause/Play button 121, the time display column 122, the first slide bar 123, the audio playback position icon 124, the first slide-bar display area 125, the speaker icon 126 and the audio volume indicator 127. In this embodiment, the first slide bar 123, the audio playback position icon 124 and the first slide-bar display area 125 are used as the first interface. The Pause/Play button 121 allows the user to switch between play and pause. While being played, the pause mark is displayed, as shown in FIG. 8. If the Pause/Play button 121 is clicked while being played, the play action is paused. A triangle mark is displayed for the Pause/Play button 121 during a pause or before starting play. If the Pause/Play button 121 is clicked while in this state, the play is started.

In the time display column 122, the current audio-play time and the total play time are displayed. In the example of FIG. 8, the current play time is shown as [01:15] meaning it is 1 minute and 15 seconds, and the total play time is shown, as [04:03] meaning it is 4 minutes and 3 seconds.

The first slide bar 123 indicates the audio playback position on the time axis. Therefore, the first slide bar moves toward the right (in the X direction in FIG. 8) as the play progresses, and the length of the bar gets longer dynamically. In this embodiment, the overall length of the first slide-bar display area 125 is set to correspond to the total audio-play time. The current audio-play time is proportioned to the total audio-play time, and accordingly the length of the first slide bar 123 is proportioned to the length of the overall length of the first slide-bar display area 125.

The audio playback position icon 124 is provided at the right edge (the edge in the x-direction) of the first slide bar 123. In this embodiment, it is shaped as a circle, and the center of the circle is positioned at the right edge (in the X-direction) of the first slide bar 123. By verifying the position of the audio playback position icon 124 and the length of the first slide bar 123 in the first slide-bar display area 125, the user can easily understand the current position of the audio play on the time axis. It is possible to omit the audio playback position icon 124. If omitted, the right edge of the first slide bar 123 indicates the current playback position. Additionally, in this embodiment, it is possible to move the right edge of the first slide bar 123 to a designated position by clicking a desired position on the first slide-bar display area 125, thereby the audio playback position can be moved to the desired position.

The speaker icon 126 is used to switch the audio output between ON and OFF. In FIG. 8, the speaker icon 126 is in ON state. If the speaker icon 126 of FIG. 8 is clicked, the audio output is turned OFF and an X mark, for example, is displayed on the speaker icon.

The audio volume indicator 127 is used to adjust the audio volume. The audio volume increases as the audio volume indicator 127 is moved to right (in the X-direction).

The example of the interface 100 for slide viewing shown in FIG. 8 is for the case in which the audio data is attached to the slide. If not attached, the first slide-bar display area 120 is not displayed.

The second slide-bar display area 130 is provided with the "Rewind (RWD)" button 131, the "Forward (FWD)" button 132, the page number display area 133, the second slide-bar display area 134, the second slide bar 135 and the slide-playback position icon 136. The "Rewind (RWD)" button 131 is used to return to the previous page of a slide. The "Forward (FWD)" button 132 is used to advance to the next page of a slide. In the page number display area 133, the current page number and the total number of pages of a slide are displayed.

In The second slide-bar display area 134, the second slide bar 135 and the slide-playback position icon 136 are displayed. In this embodiment, the second interface is provided with the second slide-bar display area 134, the second slide bar 135 and the slide-playback position icon 136. The second slide bar 135 indicates the playback position of each page of a slide on the time axis. In other words, the second slide bar 135 indicates the page of a slide currently being played. The second slide bar 135 moves toward the right (in the X direction) and the displayed length gets longer dynamically as the play progresses. In this embodiment, the overall length of the second slide-bar display area 134 is set to correspond to the total number of pages. The current page number is proportioned to the total number of pages, and accordingly the length of the second slide bar 135 is proportioned to the length of the overall length of the second slide-bar display area 134. Additionally, on the second slide-bar display area 134, tic marks 134a, 134b, 134c and 134d that correspond to each page of a slide are provided. Each of tic marks 134a, 134b, 134c and 134d corresponds to page 1, page 2, page 3 and page 4 respectively. In the example shown in FIG. 8, the right edge (in the X direction) of the second slide bar 135 is positioned at the tic mark 134c indicating the current page is page 3. The number of individual tic marks to be displayed is set to correspond to the total number of pages of a slide The slide-playback position icon 136 is displayed at the right edge (in the X direction) of the second slide bar 135. In this embodiment, the slide-playback position icon 136 is shaped as a triangle, and the apex of the triangle is positioned at the right edge of the second slide bar 135. By verifying the position of the slide-playback position icon 136 and the length of the second slide bar 135 in the second slide-bar display area 134, the user can easily understand the current position of the slide playback on the time axis. It is possible to omit the slide-playback position icon 136. If omitted, the right edge of the second slide bar 135 indicates the current playback position. Additionally, in this embodiment, it is possible to move the right edge of the second slide bar 135 to a desired position in the second slide-bar display area 134 by clicking a corresponding position of a tic mark, such as with 134a, 134b, 134c or 134d. Thus, in this embodiment, the page of a slide can be switched by clicking a desired position of the second slide-bar display area 134.

The second slide-bar display area 130 is provided with the comment display On/Off button 137 and the entire screen display switchover button 138. The comment display On/Off button 137 is an icon for switching the comment display between "On" and "Off." FIG. 8 shows that the comment display is currently on. If the comment display On/Off button 137 in FIG. 8 is clicked, an X mark, for example, appears on the button and the slide display is switched to "Off." The entire screen display switchover button 138 is for switching the entire screen display between "On" and "Off." FIG. 8 shows that the entire screen display is currently off. If the entire screen display switchover button 138 in FIG. 8 is clicked, it is turned on and the entire screen display is displayed.

The comment input column display area 140 is provided with the command icon 141, the comment input column 142 and the send comment button 143. The command icon 141 is for specifying the comment display position, the background color, etc. in the slide display area 110. The comment input column 142 is a rectangular column into which the user inputs a text of his comment. The send comment button 143 is for sending the text input in the comment input column 142.

The comment display column 150 is the third interface and is provided with the comment area 151 and the upload-time display area 152. The comment area 151 displays eats uploaded. The upload-time display area 152 displays the upload time for each comment displayed in the comment area 151.

FIG. 9 shows the state in which the page of the slide switched from page 3 to page 4 and the audio play has progressed from FIG. 3 [8?]. The details of FIG. 9 are discussed later in this document.

Next, the operational sequence between the terminal device 3 and the content distribution server 1 in this embodiment is described with reference to the sequence diagram of FIG. 10. When uploading a slide, the user starts up the application program on his terminal device 3 and displays on the display unit 30 the screen of the slide which he wants to upload. The slide should be prepared in PDF data or as PPT data (Microsoft PowerPoint (trademark) presentation software), for example. When using a smart phone as a terminal device 3, the slide data may be prepared as jpg data, for example.

In the screen for slide uploading, the user selects the PDF data by specifying PDF data or by drag and drop PDF data on the screen. Then, when the user clicks the send button on the screen, the slide uploading process is started (S1). When the send button is clicked, the terminal device 3, using the application program, sends the selected PDF data to the content distribution server 1 (S2).

Upon receiving PDF data, the serer control unit 11 of the content distribution server 1 converts the received PDF data to the slide data for viewing and stores it into the memory unit 10 of the content distribution server 1 (S3). Additionally, the server control unit 11 manages the slide data (S3). More specifically, the server control unit 11 attaches a slide ID to the slide data. In addition to slide data, the server control unit 11 receives related information such as the title of the slide data from the terminal device 3, and stores the slide ID and related information such as the title in the metadata storage region 40 of the control table TBL1 shown in FIG. 4. Additionally, the server control unit 11 stores page numbers into the page number storage region 41 and the record address of each page into the record address storage region 44. When the slide is initially uploaded, the audio is not yet uploaded, and consequently nothing is stored in the start-time storage region 42 and the end-time storage region 43 of the control table TBL1. The control table TBL1 shown in FIG. 4 illustrates the state in which the audio has been uploaded following uploading of the slide. The details are discussed later in this document.

Next it is described here how a user uploads audio narration while viewing a slide. Audio for narration can be uploaded by any user including the one who created the slide. When uploading audio, a user starts up the application program on the terminal device 3 and displays the interface 100 for slide viewing on the display area 30. The user clicks the "Start Recording" button displayed on the interface 100 for slide viewing (showing of this button is omitted in FIGS. 8 and 9), and inputs audio into the microphone of the terminal device 3. The user clicks the "Forward (FWD)" button 132 displayed on the interface 100 for slide viewing, advances the slide to the position where he wants to input audio, and speaks into the microphone.

When the "Start Recording" button is clicked, the application program starts counting the elapsed time with respect to the start of recording. The recording function of the terminal device 3 stores the audio input into the microphone as audio data into the memory section of the terminal device 3. Additionally, when the "Forward (FWD)" button 132 is clicked, the application program records the time when the "Forward (FWD)" button 132 is clicked with respect to the start time of the recording and stores the timing data into the memory section of the terminal device 3. The recording is terminated when the user clicks the "Stop Recording" button displayed on the web page or when a predetermined time elapses from the beginning of recording. After recording the narration and inputting the title etc., the user clicks the "send" button (S6), then the application program uploads the audio data from the terminal device 3 to the content distribution server 1 (S7). At this time, the application program sends the timing data for page switching to the content distribution server 1 from the terminal device 1.

When receiving the audio data from the terminal device 3, the server control unit 11 of the content distribution server 1 encodes the audio data into the audio data format for viewing, and stores in the memory unit 10 (S8). Additionally, the server control unit 11 manages audio data (S8). More precisely, the server control unit 11 attaches the audio ID to the audio data. In addition to the audio data, the server control unit 11 receives information such as the user ID of the user who uploaded audio data from the terminal device 3, and stores the audio ID, user ID, slide ID for which audio is uploaded, and the record address of the memory unit 10 into the control table TBL2, as shown in FIG. 5.

When receiving the timing data for page switching, the servers control unit 11 stores the timing data into the start-time storage region 42 of the control table TBL1 (S8). For example, the user, after starting audio recording, clicks the "forward (FWD)" button 132 at the elapsed time of 15 seconds, then the timing data for page switching becomes [0:15]. The server control unit 11 stores [0:15] into the start-time storage region 42 corresponding to page 2, as shown in FIG. 4. The end time of page 1 is noted as 1 second prior to the start time of page 2. Thus, the server control unit 111 stores [0:14] into the end-time storage region 43 corresponding to page 1, as shown in FIG. 4. For the final page, the server control unit 11 stores the timing data, which corresponds to the time when the recording was terminated, into the end-time storage region 43 corresponding to the final page.

Next, it is described how a user posts comments while viewing slide or slide with audio attached. Comments can be posted by any user including the one who created the slide or the one who posted audio. When providing comments, a user starts up the application program on the terminal device 3 and displays the interface 100 for slide viewing on the display area 30. The user inputs comments on the comment input column 142 of the interface 100 for slide viewing, and clicks the send button 143 (S11). When the send button is clicked, the application program operating on the terminal device 3 sends the text data of comments, time when the comments are made, and the page number of the slide to the content distribution server 1 (S12).

Upon receiving the text data of comments, time when comments are made and the page number of the slide from the terminal device 3, the server control unit 11 of the content distribution server 1 stores text data into the comments storage region 63 of the control table TBL3 of the memory unit 10 (S13). Additionally, the server control unit manages text data (S13). More precisely, the server control unit 11 stores the slide ID of the slide for which comments are provided into the slide ID storage region 60 of the control table TBL3. Additionally, upon receiving the time at which the comments are made, the server control unit 11 stores the time into the comment posting time storage region 61. Upon receiving the page number of the slide for which comments are made, the server control unit 11 stores the page number into the page number storage region 62.

Next, it is described how a user views a slide or slide with audio attached by manipulating the interface 100 for slide viewing.

When viewing a slide or slide with audio attached, a user starts up the application program on a terminal device 3 and displays a screen for selecting a slide on the display unit 30. Once a user selects a desired slide from the screen for selecting a slide (S16), the terminal control unit 32, which functions as the display control unit in accordance with the application program, makes the display unit 30 display the interface 100 for slide viewing.

At this time, the terminal control unit 32 sends to the content distribution server 1 the data identifying the selected slide and requests necessary data for displaying the applicable interface 100 for slide viewing (S17). Upon receiving the request for retrieving data for the selected slide, based on the data identifying the selected slide, the content distribution server 1 sends applicable data stored in the control tables TBL1, TBL2 and TBL3 to the terminal device 3 (S18).

Using the application program, the terminal control unit 32 makes the display unit 30 display the interface 100 for slide viewing based on the retrieved data, including the first slide-bar display area 120, the second slide-bar display area 130 and the comment display column 150.

When the Pause/Play button 121 of the interface 100 for slide viewing, is clicked (S16), the application program sends the request for sending data from the terminal device 3 to the content distribution server 1 (S17). If the audio playback start position is designated by the first slide bar 123 or the page number of a slide to be displayed is designated by the second slide bar 135, the request includes the information on the audio playback start position or the number of pages of a slide to be displayed. The details of designating the audio playback start position and the number of pages to be displayed are discussed later in this document.

Upon receiving the request, the server control unit 11 of the content distribution server 1 sends out the audio data that is starting from the requested playback start position and the slide data corresponding to the requested number of pages to be displayed to the terminal device 3 (S18).

Upon receiving the audio data and/or slide data, the terminal device 3 plays the slide or the slide with audio attached based on the received data.

Next, with reference to the flow chart shown in FIG. 11, the operation is explained for the case in which the audio playback start position is designated by the first slide bar 123 and/or the number of pages to be displayed is designated by the second slide bar 135. FIG. 11 shows a flow chart of the operation of the first slide bar 123 and the second slide bar 135 in the terminal device 3. The flow chart of FIG. 11 shows the operation after the application program is started up on the terminal device 3 and the interface 100 for slide viewing is displayed on the display unit 30.

Using the application program, the terminal control unit 32 of the terminal device 3 performs the initial setting (S20). For initial setting, the terminal control unit 32 sets the playback position counter 70 shown in FIG. 7 to [0:00], the first slide-bar counter 71 to [0:00] and the second slide-bar counter 72 to [1].

Next, the terminal control unit 32 determines if the first slide bar 123 has been operated or not (S21). If the first slide bar has been operated and the audio playback position has been designated (S21: YES), the terminal control unit 32 identifies the designated position with respect to the overall length of the first slide-bar display area 125, and computes the time corresponding to the designated position (S22). Additionally, the terminal control unit 32 stores the computed time into the first slide-bar counter 71 and stores the same time into the playback position counter 70 (S23). Furthermore, the terminal control unit 32 extends the display length of the first slide bar 123 to the designated position (corresponding to the computed time) (S24). Next, the terminal control unit 32 verifies the applicable page of the slide corresponding to the computed time by referencing the data on the control table TBL1 received from the content distribution server 1 (S25). For example, in the example given in FIG. 4, if the computed time is between [0:00] and [0:14], it is page 1. If the computed time is between [0:15] and [0:30], it is page 2. If the computed time is between [0:31] and [1:37], it is page 3.

The terminal control unit 32 compares the verified page number of the slide against the current page number of the slide stored in the second slide-bar counter 72, and determines if there is any change to the page number to be displayed (S26). If the terminal control unit 32 determines there is no change (S26; NO), the processing returns to Step S21. On the other hand, if it is determined that there is a change (S26: YES), the terminal control unit 32 moves the position of the second slide bar 135 to the verified page (S27) and stores the page number into the second slide-bar counter 72 (S28).

For example, let's assume that the position of the first slide bar 123 is moved from what is shown in FIG. 8 to shown in FIG. 9. If the page of the slide corresponding to the computed position is page 4, the right edge of the second slide bar 135 and the slide-playback position icon 136 are moved to the tic mark 134d for page 4.

The terminal control unit 32 references the time stored in the playback position counter 70, and displays the play time in the time display column 122. Additionally, the terminal control unit 32 references the page number stored in the second slide-bar counter 72, and displays the page number in the page number display area 133. The processing for displaying values stored in the playback position counter 70 and the second slide-bar counter 72 are in common in the flow chart shown in FIG. 11.

When the audio playback position is changed from operating the first slide bar 123 resulting in the page number of the slide to be displayed being changed, the terminal control unit 32 determines if the corresponding data is stored in the memory section. If the corresponding data is stored in the memory section, the terminal control unit 32 plays audio and slide using the data in memory. On the other hand, if the corresponding data is not stored in the memory section, the terminal control unit 32 requests the content distribution server 1 to send the data. Upon receiving the data from the content distribution server 1, the terminal control unit 32 plays audio and slide.

By carrying out the processing as described above, the movement of the second slide bar 135 is interlinked with the movement of the first slide bar 123, and consequently the position of each page of a slide on the time axis can be understood intuitively.

Next, when the terminal control unit 32 determined that the first slide bar 123 has not been operated (moved) (S21: NO), it determines if the second slide bar 135 has been operated (S29). Once the terminal control unit 32 determines that the second slide bar 135 has been operated (S29: YES), it identifies the designated position in terms of a proportion to the overall length of the second slide-bar display area 134 and computes a new page number corresponding to designated position (S30). Additionally, the terminal control unit 32 extends the display length of the second slide bar 135 to the position indicating the new page number (S31). Next, by referencing the data in the control table TBL1 received from the content distribution server 1, the terminal control unit 32 obtains the start time of the computed new page (S32). Then, the terminal control unit 32 stores the computed page number in the second slide-bar counter 72, and the obtained start time into the playback position counter 70 and the first slide-bar counter 71.

Next, the terminal control unit 32 computes the position of the first slide bar 123 in the first slide-bar display area 125 corresponding to the start time obtained (S34). Then, the terminal control unit 32 extends the display length of the first slide bar 123 to the computed position (S35).

Because the audio playback position also changes when the second slide bar 135 is operated, the terminal control unit 32 determines if the corresponding data is stored in the memory section. If the corresponding data is stored in the memory section, it plays audio and slide using the data. On the other hand, if the corresponding data is not (yet) stored in the memory section, the terminal control unit 32 sends a request to the content distribution server 1 for distributing the data. Upon receiving the data, from the content distribution server 1, it plays audio and slide.

For example, let's assume that the position of the first slide bar 123 is moved from the position shown in FIG. 8 to the position shown in FIG. 9. If the position is page 4 of the slide, the right edge of the second slide bar 135 and the slide-playback position icon 136 are moved to the position of the tic mark 134d for page 4.

By carrying out the processing as described above, the movement of the second slide bar 135 is interlinked with the movement of the first slide bar 123, and consequently the position of each page of a slide on the time axis can be understood intuitively.

Next, once the terminal control unit 32 determines that the second slide bar has not been operated (S29: NO), it determines whether audio is being played (S36). If the terminal control unit 32 determines that audio is not being played (S36: NO), it returns to the processing of step S21. On the other hand, if the terminal control unit 32 determines that audio is being played (S36: YES), it determines, by referencing the playback position counter 70, if a predetermined time has elapsed since verifying last (S37). For example, it determines if 1 second has elapsed or not. If the terminal control unit 32 determines that the predetermined time has not elapsed (S37: NO), it return to the processing of step S21.

However, if the terminal control unit 32 determines that the predetermined time has elapsed (S37: YES), it references the data in the control table TBL1 which was received from the content distribution server 1, and verifies the slide page number corresponding to the time stored in the playback position counter 70 (S38). By comparing the verified slide page number against the page number of a slide currently stored in the second slide-bar counter 72, the terminal control unit 32 determines if here is a change in the page number to be displayed (S39). If it is determined that there is a change in the page number to be displayed (S39: YES), the terminal control unit 32 moves the second slide bar 135 to the corresponding position of the new page number (S40). Additionally, the terminal control unit 32 updates the value of the second slide-bar counter 72 (S41).

After updating the value in the second slide-bar counter 72 or after determining there is no change in the page number (S37: NO), the terminal control unit 32 computes the position of the first slide bar 123 in the first slide-bar display area 125 corresponding to the time displayed in the playback position counter 70 (S42). Additionally, the terminal control unit 32 extends the display length of the first slide bar 123 to the position just computed (S43). Then, the terminal control unit 32 stores the time indicated in the playback position counter 70 into the first slide-bar counter 71 (S44), and returns to the processing of step S21.

By carrying out the processing as described above, the first slide bar 123 and the second slide bar 135 can be moved along with the passing of the play time. Thus, the position of each page of a slide on the time axis can be understood intuitively.

In this embodiment, the interface 100 for slide viewing is configured to display not only the first slide bar 123 but also the second slide bar 135 in which these two slide bars are interlinked in movement. Thus, the position of each page of a slide on the time axis can be understood intuitively, and playing of audio and slide can be performed from any desired position.

Second Embodiment

Figure 12:
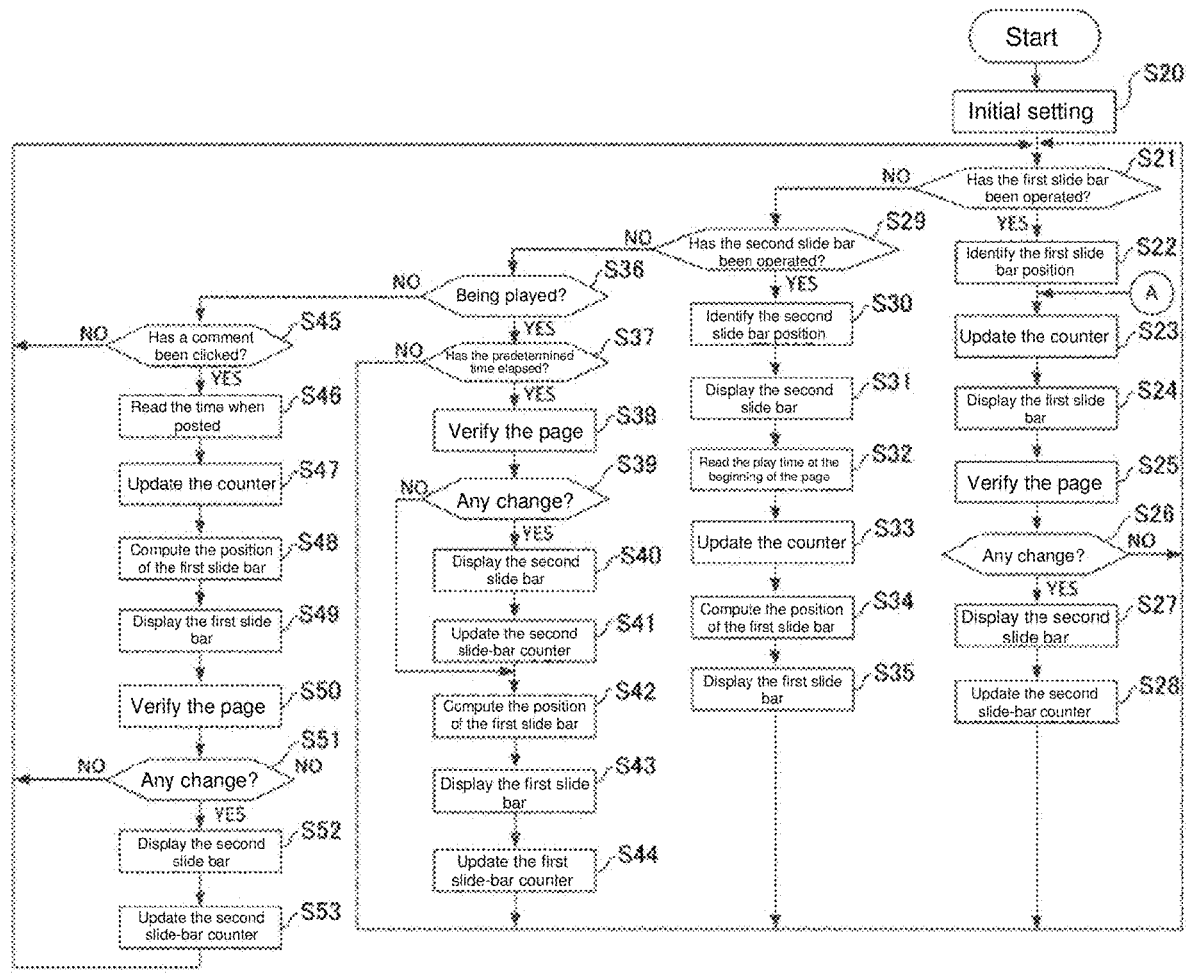
FIG. 12 is a flow chart showing the operation of the terminal device in a second embodiment of the present invention.

The second embodiment of the present invention is described with reference to figures. FIG. 12 is a flow chart of operations of the first slide bar 123 and the second slide bar 135 in the terminal device 3 of this embodiment.

In the first embodiment of the present invention, it is described how the first slide bar 123 and the second slide bar 135 are interlinked in movement when either slide bar is operated. The second embodiment of the present invention is different from the first embodiment, in which the first slide bar 123 and the second slide bar 135 in the second embodiment are interlinked with a comment and comment posting time, and when a comment or a posting time displayed in the comment display column 150 is clicked, the first slide bar 123 and the second slide bar 135 move in an interlinked manner.

In a flow chart of FIG. 12, any common step with the flow chart of FIG. 11 has the same step number. At step S36 in the flow chart of FIG. 12, if it is determined that playing of audio and slide is not currently being carried out (S36: NO), instead of going back to the processing of step S21, the terminal control unit 32 determines if a comment is clicked (S45). In other words, upon determining that audio and slide are not currently being played (S36: NO), the terminal control unit 32 determines if a comment displayed in the comment display column 150 is clicked or not (S45). If the terminal control unit 32 determines that a comment is not clicked (S45: NO), it returns to the processing of step S21.

However, if the terminal control unit 32 determines that a comment is clicked (S45: YES), it reads the posting time of the clicked comment (S46). Then, the terminal control unit 32 stores the posting time just obtained into the first slide-bar counter 71 and into the playback position counter 70 (S47). Additionally, the terminal control unit 32 computes the position of the first slide bar 123 corresponding to the posting time just obtained (S48), and extends the display length of the first slide bar 123 to the position just computed (S49). Next by referencing data in the control table TBL1 received from the content distribution server 1, the terminal control unit 32 verifies the slide page corresponding to the posting time just obtained (S50).

By comparing the verified slide page number against the page number of a slide currently stored in the second slide-bar counter 72, the terminal control unit 32 determines if there is a change in the page number to be displayed (S51). If it is determined that there is no change (S51: NO), the terminal control unit 32 returns to the processing of step S21. On the other hand, if it is determined that there is a change in the page number to be displayed (S51: YES), the terminal control unit 32 moves the second slide bar 135 to the corresponding position of the new page number (S52), and updates the page number in the second slide-bar counter 72 (S53).

As described above, if the comment playback position is designated in the comment display column 150 of the third interface, the terminal control unit 32 moves the playback positions of the first slide bar 123 in the first interface and the second slide bar 135 in the second interface to the positions corresponding to the designated comment playback position.

Thus, when a comment is clicked, the first slide bar 123 and the second slide bar 135 can be moved to positions corresponding to the clicked slide page and the posting time. In this case, the playback position of the applicable page of a slide on the time axis with respect to the clicked comment can be understood intuitively.

Third Embodiment

Figure 13:
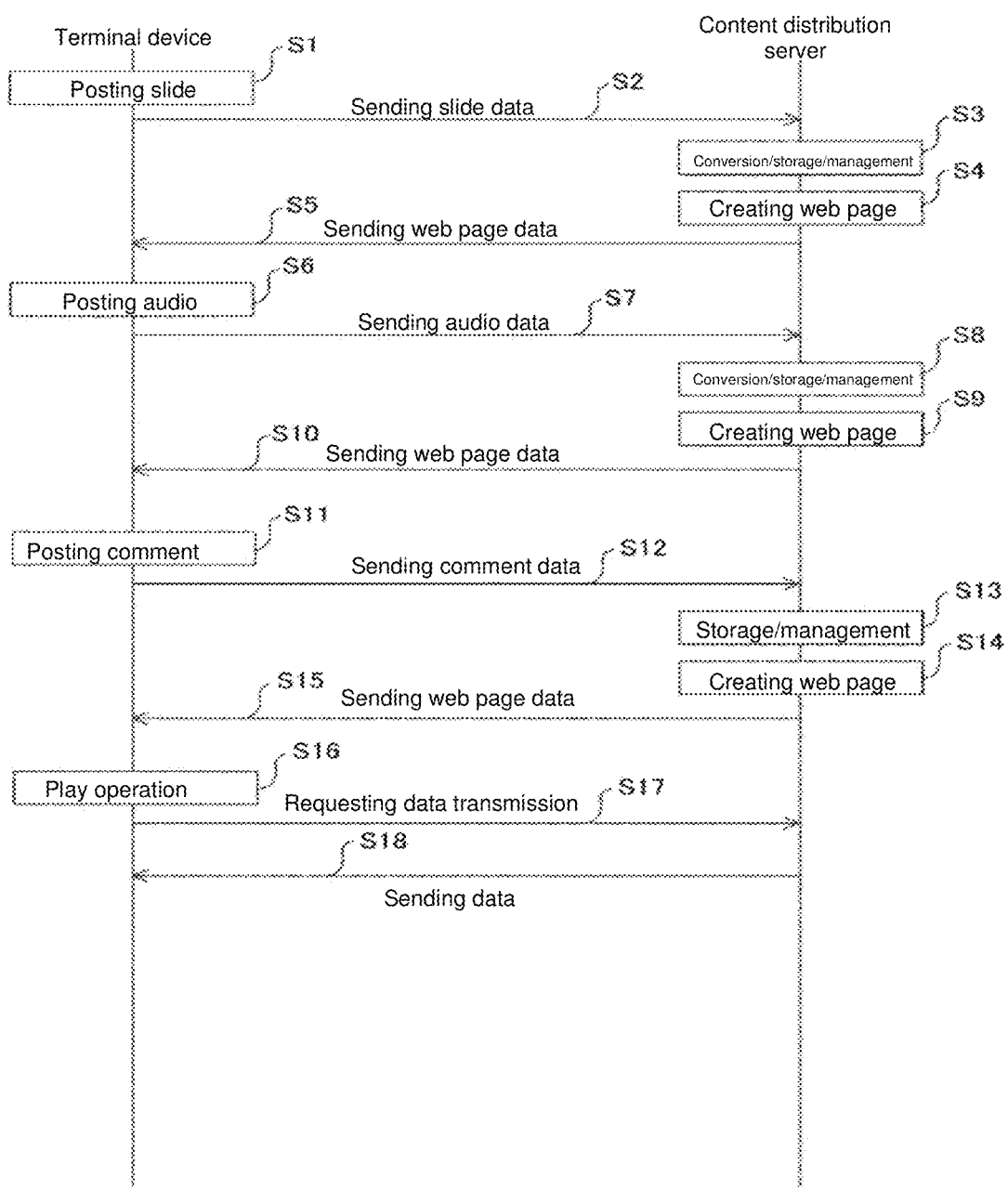
FIG. 13 shows an operational sequence between the terminal device and the content distribution server in the content distribution system of a third embodiment of the present invention.

The third embodiment of the present invention is described here with reference to figures. FIG. 13 shows an operational sequence between the terminal device and the content distribution server in the third embodiment of the present invention.

In the aforementioned the first and the second embodiments of the present invention, the aspect is described in which the application program installed in the terminal device 3 directs the display unit 30 to display the interface 100 for slide viewing. In this embodiment, an alternate aspect is described in which the program written in the web page directs the display unit 30 to display the interface 100 for slide viewing.

(Content Distribution System)

Because the summary of the content distribution system of this embodiment is the same as the summary of the content distribution system of the first embodiment shown FIG. 1, detailed explanations for areas common with the first embodiment are omitted. Additionally, the configuration of the content distribution server 1 of this embodiment is the same as the configuration of the content distribution server 1 of the first embodiment shown in FIG. 2, detailed explanations for common areas with the first embodiment are omitted. Furthermore, the configuration of the terminal device 3 of this embodiment is the same as the configuration of the terminal device 3 of the first embodiment, detailed explanations for areas common with the first embodiment are omitted.

A difference between this embodiment and the first embodiment is that, in this embodiment, the server control unit 11 of the content distribution server 1 creates a web page for slide viewing by associating it with a title. In this web page, a program is written with JavaScript (trademark) or the like so that the interface related to playing slide can be displayed. Additionally, in the web page, a program is written with JavaScript or the like so that slide can be played or paused when an instruction for play or pause is received via the interface. The content distribution server 1 presents web pages by title for viewing. By selecting a desired title of a web page from a user's terminal device 3, a user can view the desired web page on his terminal device 3. And the user can view the desired slide by manipulating the interface displayed on the web page from his terminal device 3.

In this embodiment, when audio is posted, the server control unit 11 of the content distribution server 1 creates a web page for viewing a slide with audio attached. In this web page, a program is written with JavaScript (or the like) so that the interface related to playing slide and audio can be displayed. Additionally, in the web page, a program is written with JavaScript (or the like) so that slide and audio can be played or paused when an instruction for play or pause is received via the interface. The content distribution server 1 presents web pages by title for viewing. By selecting a desired title of a web page from a user's terminal device 3, a user can view the desired web page on his terminal device 3. The user can view the desired slide with audio attached by manipulating the interface displayed on the web page from his terminal device 3.

In a web page for slide viewing (without audio attached) or slide with audio attached, if a comment associated with a slide is stored in the memory unit 10, a JavaScript (or the like) program is written for a web page in advance so that a comment can be displayed superimposing over a slide. Thus, when the user selects a desired title of a slide from his terminal device 3 and views the slide or slide with audio attached, comments are displayed along with the slide on his terminal device 3.

(Data Structure)

The configurations of tables and counters used in the content distribution system of this embodiment are the same as tables and counters used in the first embodiment shown in FIGS. 4 through 7. Therefore, detailed explanations are omitted.

(Interface for Viewing Slide)

The interfaces for slide viewing in the content distribution system of this embodiment are the same as the interfaces for slide viewing of the first embodiment shown in FIGS. 8 and 9. Therefore, detailed explanations are omitted.

The operation of the terminal device 3 and the content distribution server 1 in this embodiment is described with reference to the sequence diagram of FIG. 13. When uploading a slide, a user starts up a browser on his terminal device 3 and accesses a web page for slide uploading. The slide should be prepared in PDF data format, for example. If a smart phone is used as the terminal device 3, a slide may be prepared in jpg data format, for example.

The user can select PDF data either by specifying PDF data via a web page or by drag and drop PDF data on to a web page. Then, if the user clicks the send button displayed on the web page, the process for uploading the slide begins (S1). Once the send button is clicked, the program written into the web page sends the PDF data to the content distribution server 1 from the terminal device 3 (S2). Upon receiving the PDF data, the server control unit 11 of the content distribution server 1 converts the PDF data into the slide data for viewing, and stores it into the memory unit 10 of the content distribution server 1 (S3). The server control unit 11 manages slide data (S3). The method of managing slide data in this embodiment is the same as that of the first embodiment, therefore detailed explanations are omitted.

Next, the server control unit 11 creates a web page for slide viewing (S4). Written into the web page are a program for displaying the interface 100 for slide viewing and a program for specifying operations when each of buttons and icons on the interface 100 for slide viewing are clicked. It is configured such that the second slide-bar display area 130 is not displayed in the interface 100 for slide viewing. Additionally, the web page contains information such as the username of the user who uploaded the slide, the title of the slide and information necessary for accessing the related slide. Upon creating the web page, the server control unit 11 registers the URL (Uniform Resource Locator) of the web page to the list page of the slide. Additionally, the server control unit 11 sends the created web page data to the terminal device 3 (S5). Upon receiving the web page data, the terminal device 3 displays the web page using a browser. Thus, the user can view the slide and verify the contents immediately after uploading.

Next, it is described how a user posts audio narration while viewing a slide. Audio narration can be posted by any user including the one who created the slide. When posting audio, a user displays a web page using a browser on his terminal device 3, clicks the start recording button displayed on the web page, and speaks into the microphone of the terminal device 3. The user clicks the "Forward (FWD)" button 132 of the interface 100 displayed on the web page, and speaks into a microphone while page-feeding the slide.

When the start recording button is elicited, a JavaScript (or the like) program written in the web page measures the elapsed time with reference to the start of the recording. The recording function in the terminal device 3 stores into the memory section of the terminal device 3 the audio data input via a microphone. Additionally, when the "Forward (FWD)" button is clicked, a JavaScript (or the like) program written in the web page stores in the memory section of the terminal device 3 the timing data of when the "Forward (FWD)" button is clicked with reference to the start of recording. The recording is terminated when the user clicks the "Stop Recording" button of the interface shown on the web page or when a predetermined time elapses. After presenting the recording and inputting the title, the user clicks the send button (S6). Then, a JavaScript (or the like) program written in the web page sends the audio data to the content distribution server 1 from the terminal device 3 (S7). At this time, the program sends the timing data for page switching to the content distribution server 1 from the terminal device 3.

Upon receiving the audio data from the terminal device 3, the server control unit 11 of the content distribution server 1 encodes the audio data for viewing and stores the encoded data into the memory unit 10 (S8). Additionally, the server control unit 11 manages audio data (S8). The method of managing audio data is the same as the first embodiment, and consequently detailed explanations are omitted here.

Next, the server control unit 11 creates the web page for viewing the slide with audio attached (S9). In a web page, a program is written for displaying the interface 100 for slide viewing. In this case, as shown in FIG. 8, the second slide-bar display area 130 is configured to be displayed in the interface 100 for slide viewing. Then, the server control unit 11 sends the data of the web page just created to the terminal device 3 (S10). Upon receiving the web page data, the terminal device 3 displays the web page using a browser. Thus, the user can view the slide, listen to the audio, and verify the posted audio immediately after uploading.

Next, it is described here how a user posts comments while viewing a slide or a slide with audio attached. Comments can be posted by any user including the one who created the slide or uploaded the audio. When posting comments, a user displays a web page on the terminal device 3 using a browser, inputs comments in the comment input column 142 which is displayed on the web page, and then clicks the send button 143 (S11). Upon having the send button 143 clicked, the terminal device 3 sends to the content distribution server 1 the comment text data, the time at which comments are posted, and the page numbers of the slide on which comments are provided (S12).

Upon receiving the comment text data, the time at which comments are posted and the page numbers of the slide on which comments are provided, the server control unit 11 of the content distribution server 1 stores the text data into the comment storage region 63 of the control table TBL3 of the memory unit 10 (S13). Additionally, the server control unit 11 manages text data (S13). The method of managing text data is the same as the first embodiment, and consequently detailed explanations are omitted here.

Next, the server control unit 11 creates the web page for viewing the slide with comment attached (S14). In the web page, a program is written for displaying the interface 108 for slide viewing. In this case, as shown in FIG. 8, comments are displayed in the comment display column 150 of the interface 100 for slide viewing. Then, the server control unit 11 sends the data of the web page just created to the terminal device 3 (S15). Upon receiving the web page data, the terminal device 3 displays the web page using a browser. Thus, the user can view the slide and verify the posted comments immediately after uploading.

Next, it is described here what takes place when user clicks the Pause/Play button 121 on the interface 100 for slide viewing, when a user designates a playback position in the first slide-bar display area 125 or when a user designates the pages to be displayed in the second slide bar 135.

When a user clicks the Pause/Play button 121 on the interface 100 for slide viewing (S16), the terminal device 3 using the program written in the web page sends the request for data distribution to the content distribution server 1 (S17). If an audio playback start position is designated in the first slide bar 123 and/or a page number of a slide to be displayed is designated in the second slide bar 135, the request also includes the information on audio playback start position and/or the page number of a slide to be displayed. The details of specifying an audio playback start position and/or a page number of a slide to be displayed are discussed later in this document.

Upon receiving the request, the server control unit 11 of the content distribution server 1 sends to the terminal device 3 the audio data starting from the designated playback start position and/or slide data corresponding to the designated number of pages to be displayed (S18).

Upon receiving audio data and slide data, the terminal device 3 plays the slide and audio based on the received data.

Next, it is described here what the operation will be when the audio playback start position is designated on the first slide bar 123 and/or when page numbers of a slide to be displayed are designated on the second slide bar 135. In the first embodiment, the application program performs these operations, whereas in this embodiment, the programs written in a web page perform these operations. This is one of the differences between the first embodiment and this embodiment. However, the flow chart of this embodiment is the same as the flow chart of FIG. 11 of the first embodiment.

In this embodiment, a program written in a web page is executed once a browser is started up on the terminal device 3 and the interface 100 for slide viewing (shown in FIG. 8) is displayed. In the first embodiment, the application program executes the operations that are described with reference to FIG. 11. However, in this embodiment these operations are executed by a program written in a web page. Operations in this embodiment are the same as the first embodiment, therefore detailed explanations are omitted.

Operations following clicking of a comment displayed in the comment display column 150 or clicking of the posting time are the same as operations of the second embodiment shown in the flow diagram of FIG. 12. Therefore, detailed explanations are omitted. In the second embodiment, the application program executes the operations that are described with reference to FIG. 12. However, in this embodiment these operations are executed by a program written in a web page.

Also in this embodiment, the first slide bar 123 and the second slide bar 135 are displayed in the interface 100 for slide viewing. The first slide bar 123 and the second slide bar 135 are configured so that their movements are interlinked. Therefore, the position of each page of a slide on a time axis can be understood intuitively, and playing of audio and slide can be started from any desired position.

Also in this embodiment, when a comment is clicked, the first slide bar 123 is moved to the position corresponding to the time at which the comment was posted and the second slide bar is moved to the position corresponding to the page of the slide on which the comment was posted. Thus, with respect to a comment the position of a page of a slide on a time axis can be understood intuitively.

In this embodiment, examples are discussed in which a JavaScript (or the like) program written into a web page performs display control of the interface 100 for slide viewing. However, the present invention is not limited to these examples. For example, it is possible to have the server control unit 11 of the content distribution server 1 perform display control and other tasks in embodiments described above.

(Variations)

Figure 14:
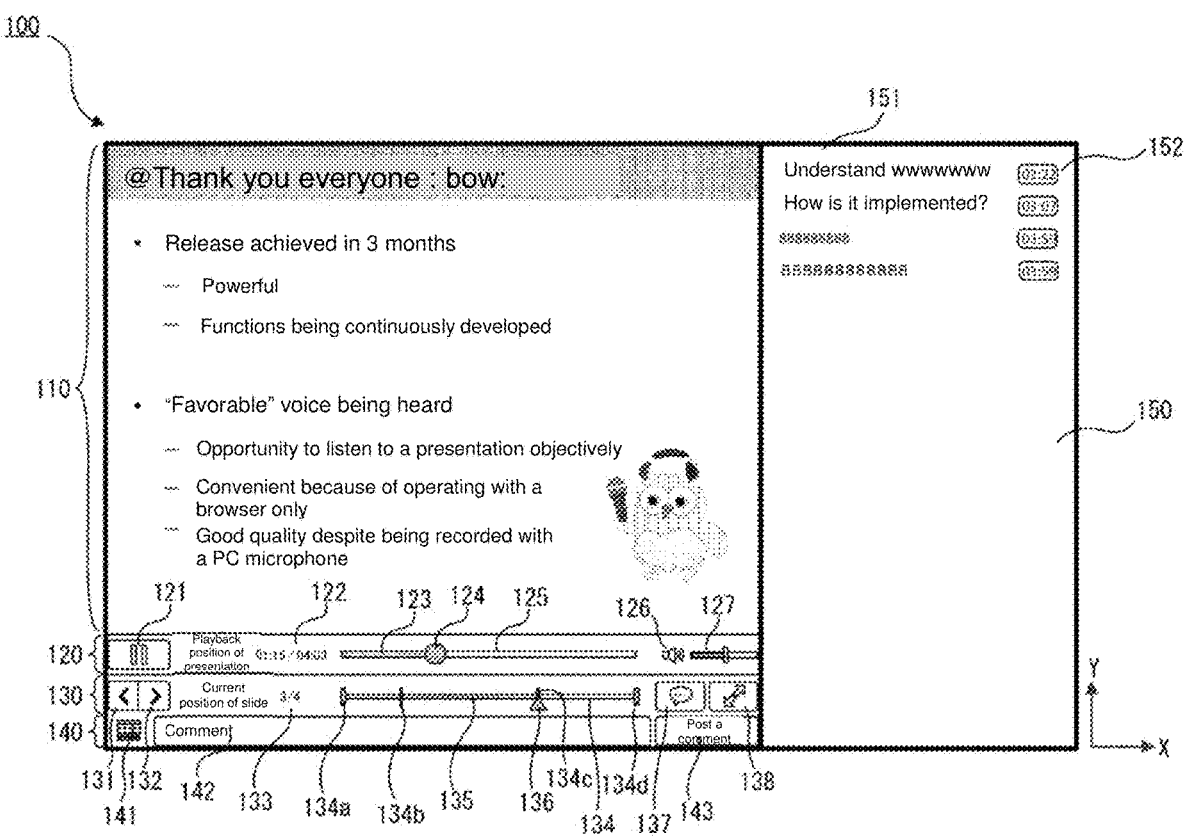
FIG. 14 shows an alternate example of the interface for slide viewing in a variation of the present invention.

In each of embodiment described above, an example is discussed in which tic marks 134a, 134b, 134c and 134d are equally spaced on the second slide-bar display area 134. However, the present invention is not limited to this example. Spacing of tic marks 134a, 134b, 134c and 134d may be varied in proportion to the switchover timing of each page, as shown in FIG. 14. If so implemented, a proportion of the time span between switchovers for each page with respect to the overall play time of the entire slide is displayed on a time axis. In doing so, not only the position of each page of a slide on a time axis but also a proportion of the play time of each page can be understood intuitively.

Figure 15:
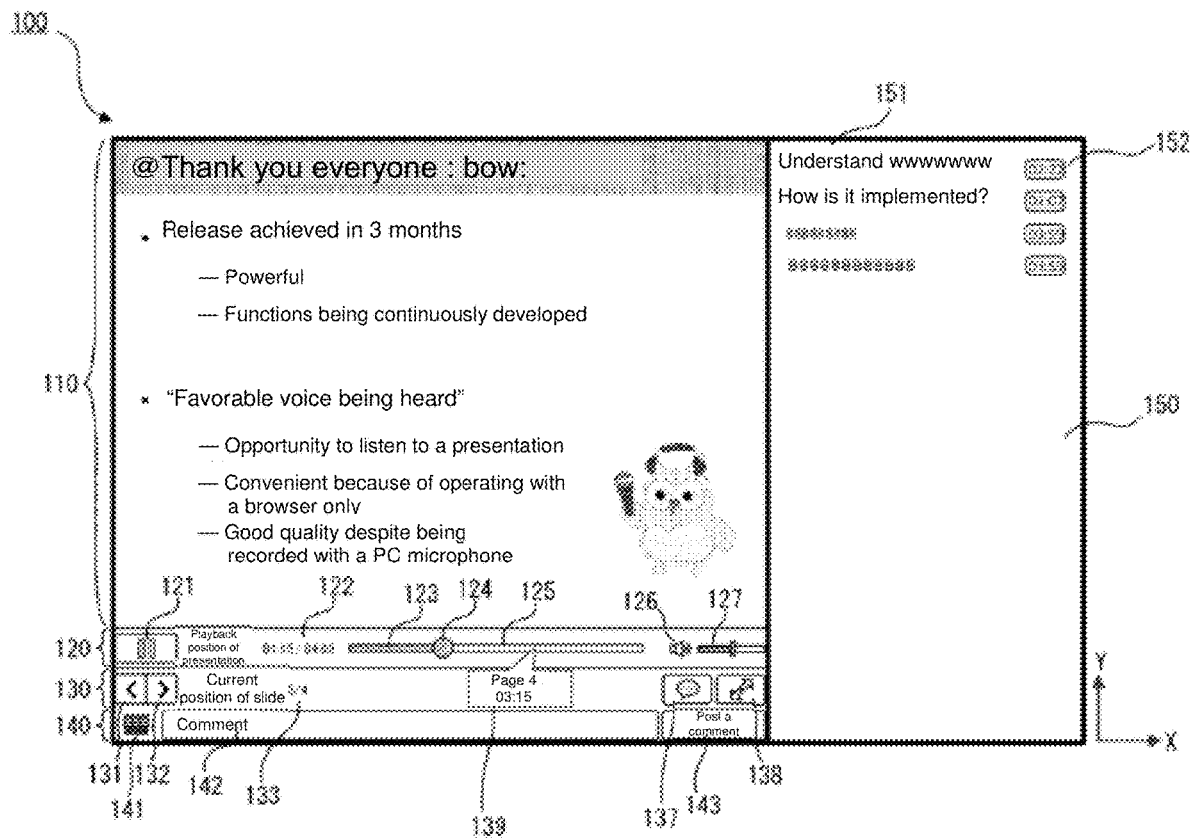
FIG. 15 shows an alternate example interface for slide viewing in a variation of the present invention.

In each of embodiment described above, an example is discussed in which the second interface is provided with the second slide-bar display area 134, the second slide bar 135 and the slide-playback position icon 136. However, the present invention is not limited to this example. As shown in FIG. 15 for example, it is possible to provide a popup 139 that shows up when a cursor is placed on any one of the first slide bar 123, the audio playback position icon 124 or the first slide-bar display area 125 in the first interface. A popup 139 should display a page number of a slide corresponding to the time axis of the first interface and the playback elapsed time with reference to the playback start time of the first page of a slide.

In each of embodiment described above, an example is discussed in which a page of a slide can be designated by clicking a position of any of tic marks 134a, 134b, 134c and 134d in the second slide-bar display area 134. However, the present invention is not limited to this example. For example, it can be configured in a way a position between pages can be designated by clicking a space between tic marks 134a, 134b, 134c and 134d, that is, for example, a space between the beginning of page 1 and beginning of page 2. In this case, the corresponding playback position of audio can be computed from the clicked position relative to the distance between tic marks 134a and 134b. If so implemented, for example, if a user wishes to start playing audio from the middle of page 1, (a midpoint between the beginning of page 1 and the beginning of page 2 can be clicked, then) an audio play can be started from any desired position of any page based on the playback position relative to the page.

In each of embodiment described above, an example is discussed in which a page of a slide for playing can be designated by clicking any of tic marks 134a, 134b, 134c and 134d on the second slide-bar display area 134. However, the present invention is not limited to this example. The "Rewind (RWD)" button 131 or the "Forward (FWD)" button 132 can be used to designate a page of a slide for playing, for example. In this case, the same processing described earlier for each embodiment can be used.

In each of embodiment described above, an example is discussed in which text data of comments are uploaded as user-posted information. However, the present invention is not limited to this example. Stamp, link information, audio data, images, etc. can be uploaded as user-posted information, for example. In this case, the same processing described earlier for each embodiment can be used.

Programs related to aforementioned aspects are stored in a recording media readable by a computer and provided to users. Then, a user can install programs on a computer. A recording media can be a non-transitory recording media, for example. Good examples are optical recording media such as CD-ROM. It also includes any well-known mat of semiconductor recording media, magnetic recording media, etc. Programs can be offered through distribution over communication network and installed in a computer.

So far, the application programs related to embodiments of the present invention are described in terms of a terminal device control method, a terminal device, and a server. However, the present invention is not limited to these. Numerous variations are possible within the scope of the present invention that do not deviate from the key points of the present invention.

INDUSTRIAL APPLICABILITY

The present invention is applicable to the field of the user interface when playing video or slide.

DESCRIPTION OF REFERENCE SIGNS

1 Content distribution server
2 Network
3 Terminal device
11 Server control unit
123 The first slide bar
124 Audio playback position icon
125 The first slide-bar display area
134 The second slide-bar display area
135 The second slide bar
136 Slide-playback position icon

The invention claimed is:

1. A non-transitory computer readable storage medium storing an application program executable by a computer of a terminal device which is configured to play slides and an audio synchronized with the slides, wherein the application program causes the computer of the terminal device to function as:
 a display control unit configured to display an interface related to playing the slide and the audio, wherein the interface comprises:
  a first interface that represents a playback position of audio; and
  a second interface that represents a playback position of each slide of the slides;
 a play control unit configured to play the slide and the audio starting from a position designated on the interface; and
 a user-posted information control unit configured to execute:
  sending user-posted information received at a terminal device to a server; and
  receiving back user-posted information from the server,
 wherein the display control unit further comprises a third interface that represents a playback position of the user-posted information,
 wherein in either case when a playback position of any one among the first interface and the second interface is designated, the display control unit is configured to make a playback position of the other correspond to the designated playback position,
 wherein when a playback position of the user-posted information is designated on the third interface, the display control unit is configured to make the playback positions of the first and the second interfaces correspond to the designated playback position, and
 wherein the display control unit is configured to display the slide number associated with the user-posted information when the playback position of the user-posted information is designated on the third interface.

2. The non-transitory computer readable storage medium according to claim 1, wherein
 the second interface is configured to indicate the switchover timing of each slide as part of a playback position.

3. The non-transitory computer readable storage medium according to claim 2, wherein
 the second interface is configured to indicate the time span between switchovers for each slide in proportion to the overall play time of the entire slides.

4. The non-transitory computer readable storage medium according to claim 1, wherein
 the second interface displays a popup in the first interface, wherein the popup further includes a playback elapsed time with respect to the beginning of playback of the first slide.

5. A method for controlling a terminal device that plays slides and an audio synchronized with the slides, the method comprising:
 displaying an interface related to playing of the slides and the audio; and
 playing the slides and the audio starting from a position designated on the interface, wherein
 the interface comprises:

a first interface that represents a playback position of audio; and a second interface that represents a playback position of each slide of the slides, wherein in either case when the playback position of any one among the first interface and the second interface is designated, the interface is configured to make the playback position of the other correspond to the designated playback position, and wherein the method further comprises:

sending user-posted information received at the terminal device to a server; and receiving back user-posted information from the server;

representing a playback position of the user-posted information by a third interface; and displaying the slide number associated with the user-posted information designated on the third interface.

6. A terminal device which is configured to play slides and an audio synchronized with the slides, the terminal device comprising a processor configured to control:

a display control unit configured to display an interface related to playing of the slides and the associated audio;

a play control unit configured to play the slides and the associated audio starting from a position designated on the interface; and a user-posted information control unit configured to send user-posted information to a server, and further configured to receive user-posted information from the server, wherein the interface comprises:

a first interface that represents a playback position of audio;

a second interface that represents a playback position of each slide of the slides; and a third interface that represents a playback position of the user-posted information, wherein in either case when the playback position of any one among the first interface and the second interface is designated, the display control unit is configured to make the playback position of the other correspond to the designated playback position, and wherein the display control unit is configured to display the slide number associated with the user-posted information when the playback position of the user-posted information is designated on the third interface.

7. A server configured to communicate with terminal devices and configured to distribute contents containing slides and associated audio that have been posted from the terminal devices, wherein the server comprises a processor configured to control:

a server control unit configured to display an interface related to playing the slides and the audio on at least one terminal device of the terminal devices that is configured to communicate with the server; and a user-posted information control unit configured to receive user-posted information from the terminal devices, and further configured to send user-posted information to the terminal devices, wherein the interface comprises:

a first interface that represents a playback position of audio;

a second interface that represents a playback position of each slide of the slides; and a third interface that represents a playback position of the user-posted information, wherein in either case when the playback position of any one among the first interface and the second interface is designated, the playback position of the other is made to correspond to the designated playback position, and wherein the server control unit is configured to display the slide number associated with the user-posted information when the playback position of the user-posted information is designated on the third interface.

* * * * *